United States Patent Office 3,461,926
Patented Aug. 19, 1969

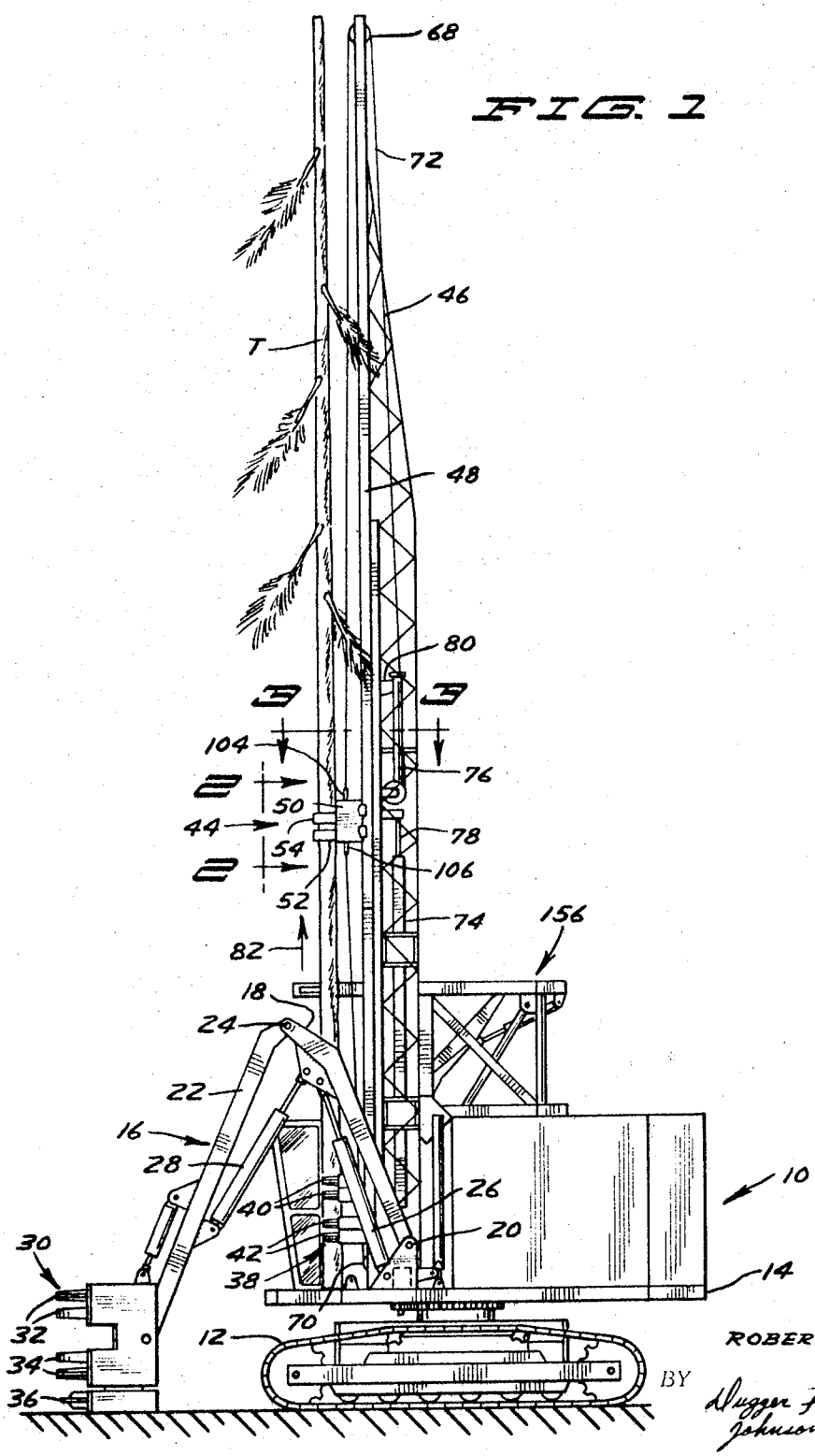

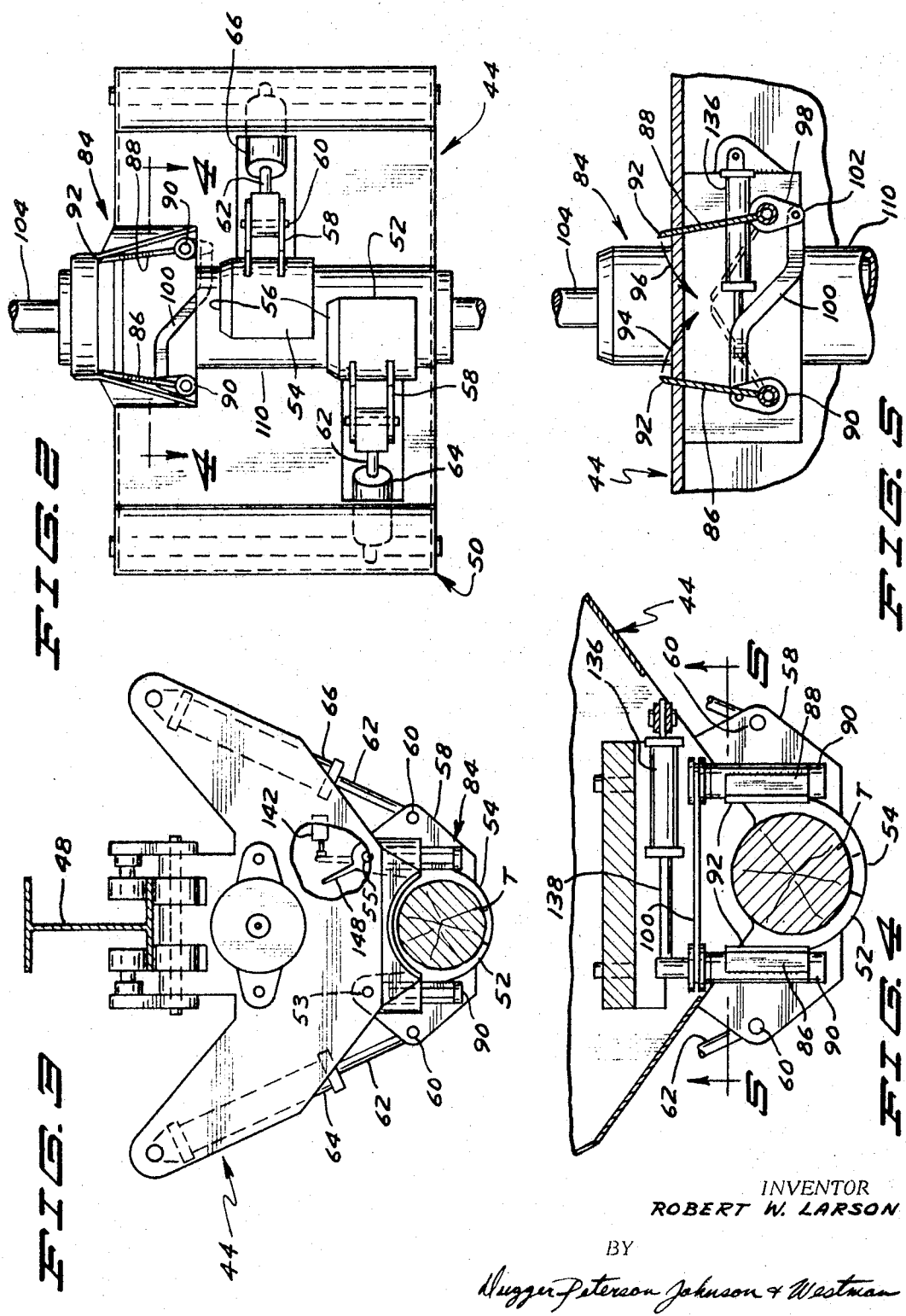

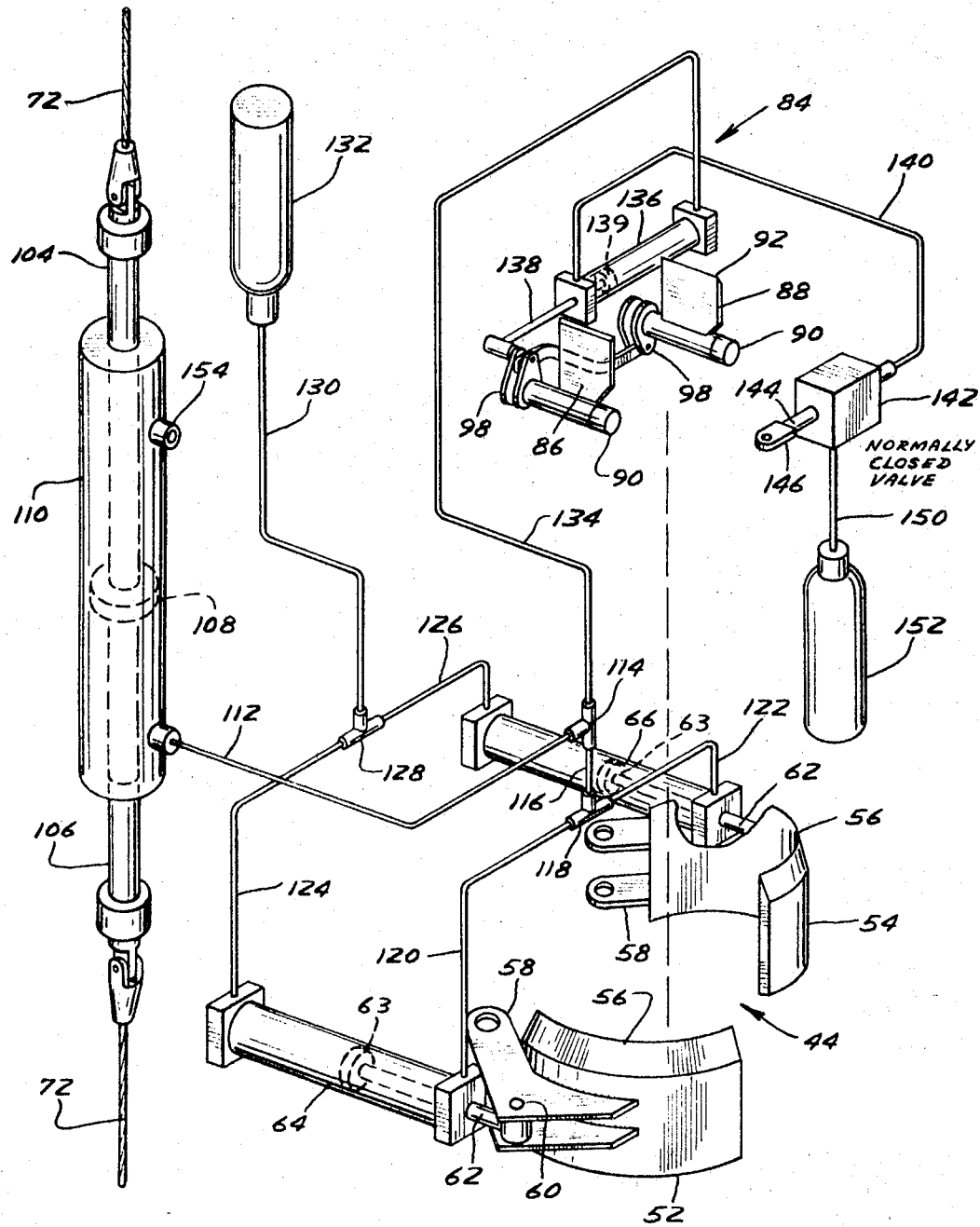

3,461,926
APPARATUS FOR TOPPING AND DELIMBING TREES
Robert W. Larson, Port Arthur, Ontario, Canada, assignor to Beloit Corporation, Beloit, Wis., a corporation of Wisconsin
Filed Oct. 25, 1967, Ser. No. 678,037
Int. Cl. B27b *1/00, 23/00*
U.S. Cl. 144—2
14 Claims

ABSTRACT OF THE DISCLOSURE

A cable raises and lowers a delimber head along a vertical tree. Carried on the head is a first pair of blades for removing the branches and a second pair of blades for removing the top portion of the tree. Both sets of blades are operated through the agency of a self-contained hydraulic circuit. The topping blades, however, are not actually operated until the head has reached an elevated portion of the tree having a predetermined diminished size, the contraction of the delimbing blade automatically triggering the operation of the topping blades.

BACKGROUND OF THE INVENTION

Field of the invention

This invention relates generally to equipment for tree-length logging, and pertains more particularly to apparatus for delimbing and topping vertical or standing trees.

Description of the prior art

U.S. Patent No. 3,253,487 for "Apparatus for Delimbing and Felling Trees" was granted on May 24, 1966 to Robert W. Larson et al. While the invention disclosed in the patent embodies delimbing and topping apparatus, this apparatus has required the employment of hydraulic tubes or hoses that must be connected to the delimber head and repeatedly lifted and lowered therewith in order to supply the energy for delimbing the branches as the head moves upwardly and also for actuating the topping mechanism after the tree has been delimbed.

SUMMARY OF THE INVENTION

A primary object of the present invention is to eliminate the hydraulic tubes or hoses that have previously been required in the operation of delimbing and topping apparatus. Use is made of the pulling forces utilized in raising and lowering the delimbing head for providing the necessary energy for operating both the delimbing blades and topping blades. More specifically, it is an aim of the invention to have the delimbing blades constantly urged in their ascent toward the tree so that knife edges disposed at the upper ends thereof will effectively remove the branches as the head progresses upwardly. Since the topping of the vertical tree is to occur only after the useable length thereof has had its branches removed, provision is made for actuating the topping blades when the delimbing blades have sensed a predetermined diminished size of tree. In both instances, the energy for actuating the respective blades is derived from the pulling action of the cable.

In its more specific aspects, the invention contemplates the storage of fluid energy when the delimber head is pulled downwardly which energy is released when the head is pulled upwardly. Hence, the stored energy is instrumental in urging the delimbing blades against the vertical tree as the head is subsequently pulled upwardly, and the two accumulators, there being one for each set of blades, are recharged when the head is again pulled downwardly. The delimbing blades, by reason of their contraction against the tree, are utilized for sensing the reduction in tree size. A normally closed valve is opened when the desired size is sensed and a fluid motor for the topping blades is made effective only during the upper portion of the delimber head travel. In other words, the energy stored in the accumulator for the topping blades is derived as the head is initially pulled downwardly from a preceding operation and is released toward the end of the upper portion of the head travel for actuating the topping blades inwardly against the tree so as to effect the topping thereof.

BRIEF DESCRIPTION OF THE DRAWINGS

FIGURE 1 is a side elevational view of a mobile vehicle equipped with my delimbing and topping apparatus;

FIGURE 2 is a front elevational view of the delimbing and topping apparatus taken in the direction of line 2—2 of FIGURE 1;

FIGURE 3 is a plan view of the delimbing and topping apparatus taken in the direction of line 3—3 of FIGURE 1, a portion being broken away so as to illustrate the cam that triggers the topping blades into operation after a tree has been delimbed;

FIGURE 4 is a sectional view taken in the direction of line 4—4 of FIGURE 2 for the purpose of showing the major components constituting the topping mechanism;

FIGURE 5 is a sectional view taken in the direction of line 5—5 of FIGURE 4, this view illustrating the relationship of the topping blades prior to being pivoted inwardly to accomplish the topping of a tree, and FIGURE 6 is an exploded perspective view of the delimbing and topping apparatus, the separation of the parts allowing the hydraulic circuitry to be superimposed thereon.

DESCRIPTION OF THE PREFERRED EMBODIMENT

Referring now in detail to FIGURE 1, it will be discerned that the vehicle has been designated generally by the reference numeral 10. The vahicle 10 includes a pair of endless tracks 12 and a swing platform 14. A boom assembly has been indicated generally by the reference numeral 16 and comprises a main boom 18 pivoted at its lower end to the swing platform at a location 20 and an end or knuckle boom 22 pivotally connected to the main boom 18 at 24. An expansible chamber motor 26 is employed for raising and lowering the main boom 18 and a second expansible chamber motor 28 actuates the end or knuckle boom 22 relative to the main boom 18. The hoses or tubes for supplying hydraulic fluid under pressure to the motors 26 and 28 have been omitted for the sake of simplicity.

Carried at the free end of the boom assembly 16 is a boom grapple and shearing unit labeled generally by the reference numeral 30, the grapple portion comprising a pair of upper jaws 32 and a pair of similar lower jaws 34. The butt shear portion of the unit 30 includes a pair of shear blades 36 which are provided with opposed knife edges so that a standing tree can be cut while being held by the grapple jaws 32 and 34. Then by means of the articulated boom assembly 16, the cut tree can be raised to the level of the platform 14.

Although not readily understandable from the pictorial information presented in FIGURE 1, the grapple and butt shear unit 30 is swingable about a vertical axis so as to shift the cut tree to a delimbing station. Located at the delimbing station is a transfer grapple indicated generally by the reference numeral 38 and having an upper pair of clamping jaws 40 and a lower pair of clamping jaws 42. Consequently, when the grapple and butt shear unit 30 is swung so as to shift the cut tree, designated by the letter T, to the transfer grapple 38, the jaws 40, 42 will securely hold the tree T during the ensuing delimbing and topping operation.

The combined delimbing and topping apparatus has been assigned the reference numeral 44 and moves as a unit along an upstanding mast 46 that need not be referred to in detail other than to mention that it will be sufficiently high to accommodate the tallest tree to be harvested 50 feet, if the trees are approximately 55 to 65 feet tall. Since it is desired, though, that the mast 46 be as lightweight as possible it is composed of a plurality of individual struts that are welded together to provide a rigid vertical structure. Extending upwardly along the forward side of the mast 46 is a track 48.

The delimbing and topping apparatus 44 comprises a delimber head 50, which is guided along the track 48, having contractible curved blades 52, 54 carried thereon, each blade being formed with an upwardly directed knife or cutting edge 56 thereon (shown in FIGURES 2 and 6), As can be discerned from FIGURES 2 and 6, each curved blade 52, 54 is provided with a clevis-like arm or ear unit 58. A pin extends through each of these arm units 58 and connects with the projecting end of a piston rod 62 extending from a piston 63 slidably contained in a cylinder, there being two such cylinders 64 and 66 inasmuch as the projecting end of the piston rod 62 for the cylinder 64 is connected to the curved blade 52 and since the projecting piston rod 62 for the cylinder 66 operates the other curved blade 54. For the time being, it will be merely mentioned that as the diameter of the tree T being delimbed diminishes, the curved blades 52 and 54 are continually moved inwardly so as to follow the reduction in tree size.

For the purpose of swiftly raising the delimbing head 50 in order to effect the delimbing of the branches by impact shearing or cleavage, the head is pulled very rapidly upwardly along the mast 46 as guided by the track 48. In the furtherance of this pulling function, a pulley 68 is rotatably disposed at the top of the mast 46 and a second pulley 70 is similarly rotatably disposed at the bottom of the mast. Entrained about these pulleys 68 and 70 is a cable 72, the ends of the cable being connected to the head in a manner presently referred to. Although not important to a practising of the present invention, it can be pointed out that within the confines of the mast 46 is an auxiliary track which longitudinally guides a sheave mechanism or multiplying device 74, there being a plurality of small wheels (not shown) riding against each side of the track so as to be guided thereby. It will be appreciated that a series of pulleys or sheaves are included in the mechanism 74 and will therefore provide an extremely large travel of the head 50 for a limited amount of movement imparted to the sheave mechanism 74. If further description is desired in connection with the sheave mechanism 74, resort can be made to the aforesaid U.S. Patent No. 3,252,487 issued on May 24, 1966 to Robert W. Larson et al.; the alluded to device is pictured in FIGURE 9 of this patent.

In order to raise and lower the sheave mechanism 74, a cylinder 76 is employed, its projectable and retractable piston rod being designated by the numeral 78. The closed or upper end of the cylinder 76 is attached to the most 46 at 80. Consequently, whenever the piston rod 78 is urged downwardly by introducing hydraulic fluid under pressure into the cylinder 76, the sheave mechanism 74 will swiftly pull the delimbing head 50 upwardly in the direction of arrow 82 shown in FIGURE 1.

The topping mechanism, although part of the apparatus 44, has been given a separate reference numeral 84, to facilitate the description thereof, the topping mechanism being mounted on the delimber head 50. FIGURES 2-6 portray the topping mechanism in considerable detail and it will be perceived that this mechanism includes a pair of flat blades 86 and 88 which are pivotally mounted on parallel axes furnished by a pair of spaced pins 90 anchored to a portion of the head 50. Each blade 86, 88 has a straight knife edge 92. From FIGURE 5, it will be discerned that the pivotal mounting of the blades 86 and 88 allow them to be rotated about parallel horizontal axes in the direction of the arrows 94 and 96 to perform the topping operation. The position shown in phantom outline illustrates the blades 86 and 88 fully operated in their topping direction that result in the severance of the upper portion of the tree.

In order that the blades 86 and 88 will be rotated in unison toward each other, a short lever arm 98 is provided in association with each blade 86 and 88, the lever arms 88 being interconnected by a link 100 having a pin 102 at each end which connects the lever arms 98 together and results in the rotation as indicated by arrows 94, 96 applied to FIGURE 5.

While it has heretofore been stated that the cable 72 entrained about the pulleys 68 and 70 is connected to the delimber head 50, this, strictly speaking, is not a complete story; at least, the connection is not a direct one. More precisely, the cable 72 is connected at the upper side of the delimbing head 50 to an upwardly projecting piston rod 104 and the other end of the cable 72, after passing through the sheave mechanism 74, is similarly connected to a downwardly projecting piston rod 106. The piston rods 104 and 106 could be construed to constitute a single rod having a piston 108 (shown in dotted outline in FIGURE 6) located intermediate its ends. The piston 108 is slidably contained in a cylinder 110 and this cylinder is shown in FIGURES 2 and 5 but more clearly in FIGURE 6. FIGURE 6 is of advantage because it illustrates the cylinder 110 in an exposed or detached relationship from the frame structure constituting the head 50. Actually, the cylinder 110 is vertically oriented and affixedly embodied in the head 50, thereby providing upper and lower ends to the cylinder through which the rods 104 and 106 project.

Before describing the method of actuating the blades 86, 88 of the topping mechanism 84, it will be well to consider the manner in which the delimbing blades 52 and 54 are actuated. FIGURE 6 illustrates a conduit in the form of a tube 112 coming from the lower portion of the cylinder 110. The tube 112 continues to a first T connection 114 which is in turn connected to a downwardly extending tube 116 which leads into a second T 118 having a pair of tubes 120 and 122 extending therefrom and communicating with the closed ends of the previously mentioned cylinders 64, 66 associated with the delimbing blades 52, 54. Additional tubes 124, 126 connect with the closed ends of the cylinders 64, 66 and are joined together by a third T 128 having a tube 130 leading upwardly to a hydraulic accumulator 132. As far as this portion of the hydraulic circuitry is concerned, it deals with the operation of the topping blades 86 and 88, and it is to be noted that a tube 134 extends upwardly from the T connection 114 and that this tube 134 connects with the closed end of a cylinder 136 having a piston rod 138 extending from a piston 139 slidably contained in this cylinder. It is the piston rod 138 that has its projecting end connected to the lever arm 98 that is integral with the blade 86 and the link 100 mechanically couples the movement of this blade to the other blade 88 so that the blades will be moved in the direction denoted by the arrows 94, 96 superimposed upon FIGURE 5.

The open end of the cylinder 136 from which the piston rod 138 projects has a tube 140 leading to a normally closed valve 142 provided with a plunger 144 having a roller 146 mounted thereon which is actuated by a cam finger 148 (FIGURE 3) when the delimbing blades 52, 54 have reached a predetermined degree of contraction due to the diminution in tree size and at an elevation where the delimbing of the useable tree length has been completed. It will be remembered that the delimbing blades 52, 54 follow the diameter of the tree during the delimbing action. The finger 148 shown in FIGURE 3 merely moves in a clockwise direction with the blade 54, striking the roller 146 carried at the exposed end of the plunger 144 when the blade 54 has moved sufficiently inward, the inward position typically representing a tree portion or size having a three inch diameter. This opens the valve 142. Leading from the valve 142 is a vertical tube 150 which has communication at its lower end with a second hydraulic accumulator 152.

From what has been described, it will be appreciated that the cylinder 110 and its piston 108, the cylinder 64 and its piston 63, the cylinder 66 and its piston 63, and the cylinder 136 and its piston 139 comprise four expansible chamber means which are interconnected by the tubing that has now been referred to. In other words, it should be recognized that the hydraulic circuit that involves these expansible chamber means is a self-contained one. With such recognition in mind, it will be understood that when the cable 72 is pulled downwardly, the piston rod 106 that projects downwardly from the lower end of the cylinder 110 will be pulled downwardly toward the bottom of the cylinder 110, thereby producing a decrease in volume beneath the piston 108. Since the space beneath the piston 108 has been decreased, the hydraulic fluid contained therein will be acted upon by the piston 108 and an increase in pressure under this piston will result. Such action creates a positive pressure condition that forces hydraulic fluid into the cylinders 64 and 66 through the tubes 112, 116, 118 and 122, as well as into the cylinder 136 via the tube 134. There is no valve between the cylinders 64 and 66 and the cylinder 110 so that the delimbing blades 52 and 54 will be urged outwardly or away from the tree that has been delimbed by these blades during their upward travel. A vent 154 in the upper portion of the cylinder 110 above the piston 108 allows the entrance of air as the piston 108 moves downwardly and escape of air when the piston 108 moves upwardly during the ascent of the head 50.

What transpires is that the accumulators 132 and 152 store fluid energy as the piston rod 106 is pulled downwardly during the descent of the head 50, for this action causes fluid to be forced from the cylinder 110 through the tube 112, the tube 116 and the tubes 120, 122 which causes the pistons 63 contained in the cylinders 64 and 66 to be moved closer to their closed ends with the consequence that fluid is forced from the closed ends of the cylinders 64 and 66 through the tubes 124, 126 and the tube 130 into the accumulator 132. The communication path for the accumulator 152 is via the tube 112, the tube 134 into the closed end of the cylinder 136 which will cause the piston 139 contained in this cylinder to be urged toward the open end thereof with the consequence that hydraulic fluid is forced through the tube 140, the valve 142 (when open), the tube 150 into the accumulator 152. Of course, an open hydraulic circuit into and from the accumulator 152 is only possible when the plunger 144 has been actuated by the cam 148 mounted on the delimbing blade 54.

Thus, it is the lowering of the head 50 that automatically results in a charging and subsequent re-chargings of the accumulators 132 and 152, each re-charging of the accumulator 152 not being able to take place until the valve 152 opens as explained above. It will be appreciated that when the cable 72 is pulled upwardly to perform a delimbing operation through the agency of the blades 52, 54, more specifically the knife edges 56 located at their upper ends, the piston rod 104 is pulled upwardly with the piston 108. This allows the accumulator 132 to discharge its stored fluid energy through the tubes 130, 124 and 126 into the closed ends of the cylinders 64 and 66 with the result that the pistons 63 are forced toward the open ends of the cylinders 64, 66 with the consequence that the blades 52 and 54 are actuated inwardly toward the tree about parallel vertical axes provided by pins 53 and 55 (FIGURE 3) on the head 50 and thus these blades perform their delimbing function as the head 50 is pulled outwardly.

When the cam finger 148 (FIGURE 3) strikes the roller 146 (FIGURES 3 and 6) the blade 54 has moved sufficiently inward during the upward travel of the head 50 so that the topping operation should be initiated. Since the delimbing blades 52 and 54 are continually urged against the tree T, they function, more specifically the blade 54, as a sensing means which determines when the size of the tree has diminished to the extent that the topping action should be instituted. It is the opening of the valve 142 to allow hydraulic fluid that has been stored in the accumulator 152 to flow upwardly through the valve 142 into the open end of the cylinder 136. The fluid under pressure entering the cylinder 136 forces the piston 139 to the right or toward the closed end of the cylinder 136 with the result that the piston rod 138 pivots the blade 88, the blade 88 also is pulled inwardly. All that has to occur is that the topping blades 86, 88 move slightly inwardly in the direction of the arrows 94, 96 of FIGURE 5 because the sharpened edges 92 on these two blades continue to dig into the tree as the head 50 progresses upwardly, this causing further skiving or cleaving without assistance from the piston rod 138. In other words, it is just an initial amount of rotative movement of the topping blades 86, 88 that is required in order to effect a complete cleavage and topping of the tree T after it has been delimbed by the blades 52 and 54. Of course, when the head 50 is pulled downwardly, the movement of the blade 54 outwardly will soon allow the valve 142 to re-close. However, the downward movement of the head 50 and the associated downward movement of the piston 108 will quickly recharge the accumulator 152 to the extent that it is needed for release of its stored energy for the next de-topping operation.

It should perhaps be pointed out once again that the vent 154 allows air to escape from the upper portion of the cylinder 110 when the head 50 is being raised, but when there is a downward pull exerted on the cable 72, which pulls the piston 108 downwardly, the cable is then acting upon the lower piston rod 106 and air is drawn back in to the upper portion of the cylinder 110 via this vent 154.

In brief, the accumulators 132 and 152 are continually recharged during each descent of the head 50, although the accumulator 152 is recharged during only a portion of the descent, this being the initial portion of each descent. It is the closing of the valve 142 that precludes further recharging of the accumulator 152, but it will be recognized that only a small amount of stored fluid energy is required as far as the accumulator 152 is concerned since it is only an initial rotation or rocking of the topping blades 86 and 88 that is necessary to effect the topping of the unusable portion of the tree T after the usable portion has been delimbed.

After the delimbing and topping operation has been completed, the transfer grapple 38 shifts the tree-length log into a collector 156. When a sufficient number of tree-length logs have been accumulated, the collector 156 deposits these logs onto the ground so that they can be skidded or trucked to their destination.

From the information herein presented, it will be apparent that the delimbing and topping means designated generally by the reference numeral 44 requires no hydraulic tubes or hoses that must be pulled upwardly and later downwardly during the delimbing and topping process. Thus the expense of providing such hoses is eliminated and at the same time any likelihood of entanglement is obviated. Not only are these tubes completely eliminated, but the topping action is inaugurated automatically without manipulation by the human operator.

What is claimed is:

1. Apparatus for delimbing trees comprising a head, delimbing blade means mounted on said head for movement relative thereto, means for moving said head along a tree to be delimbed, means connected to said head and said moving means for developing a fluid pressure due to movement of said moving means, and means responsive to said fluid pressure for moving said blade means.

2. Apparatus for delimbing trees in accordance with claim 1 in which said blade means has an upwardly directed edge, and said means for moving said head includes a cable for pulling said head both upwardly and downwardly along a vertical tree to be delimbed.

3. Apparatus for delimbing trees in accordance with claim 2 in which a positive fluid pressure is developed when said cable pulls said head downwardly, and means responsive to said developed pressure for storing fluid energy for use when said cable pulls said head upwardly.

4. Apparatus for delimbing trees in accordance with claim 3 in which said blade moving means moves said blade means away from the tree when said cable is pulling said head downwardly and the stored fluid energy moves said blade means towards said tree when said cable is pulling said head upwardly.

5. Apparatus for delimbing trees in accordance with claim 1 including a topping mechanism controlled by said delimbing blade means when said blade means has moved to a predetermined position in the direction of the tree being delimbed.

6. Apparatus for delimbing trees in accordance with claim 5 in which said topping mechanism includes movable blade means for severing the upper portion of the tree, and a means responsive to said fluid pressure for moving said last-mentioned blade means.

7. Apparatus for delimbing trees in accordance with claim 3 including additional blade means on said head for movement relative thereto for topping the tree after delimbing by said first blade means, means for moving said topping blade means away from the tree when said cable is pulling said head downwardly and toward said tree when said cable is pulling said head upwardly, stored fluid energy causing said topping blade means to be moved toward said tree to sever the top portion of the tree.

8. Apparatus for delimbing trees in accordance with claim 7 including means controlled by said delimbing blade means for delaying the movement of said topping blade means toward said tree until the head has reached an upper portion of the tree having a predetermined diminished size as sensed by said delimbing blade means.

9. Apparatus for delimbing trees in accordance with claim 8 in which said delimbing blade means includes a pair of curved blade members mounted for pivotal movement on said head about a pair of parallel vertical axes, each of said curved blade members having an upwardly directed knife edge, and in which said topping blade means includes a pair of flat blade members mounted for pivotal movement on said head about a pair of parallel horizontal axes, each of said flat blade members having an upwardly directed knife edge.

10. Apparatus for delimbing trees comprising a head, blade means carried on said head movable against a tree for severing branches therefrom, means for pulling said head along the tree to be delimbed, first expansible chamber means including a cylinder member and a piston member slidably contained therein, one of said members being attached to said delimber head and the other said members being connected to said pulling means, second expansible chamber means including a cylinder member and a piston member slidably contained therein, one of the members of said second expansible chamber means being attached to said delimber head and the other thereof being connected to said blade means, and conduit means providing fluid communication between said cylinder members whereby change in fluid pressure in said first expansible chamber means is transmitted to said secinder member and a piston member slidably contained therein, one of the members of said third expansible chamber means being attached to said head and the other thereof being connected to said second blade means, and means providing fluid communication between the cylinder member of the first expansible chamber means and the cylinder member of said third expansible chamber means whereby a change in fluid pressure in said first expansible chamber means is transmitted to said third expansible chamber means to cause actuation of said second blade means.

12. Apparatus for delimbing trees in accordance with claim 11 in which the cylinder member of said first expansible chamber means is attached to said head in a vertically oriented position and the piston member thereof has a first rod extending through the upper cylinder end and a second rod extending through the lower cylinder end, said pulling means including a cable having one end connected to said first rod and its other end connected to said second rod, the cylinder member of said second expansible chamber means being attached to said head and the piston member thereof having a rod extending through an open end of this cylinder member and connected to said first blade means for moving said first blade means against the tree when this rod is extended to cause said first blade means to sever branches from the tree and withdrawing said first blade means from the tree when this rod is retracted, the other end of the cylinder of said second expansible chamber means being closed, said conduit means leading from the lower end of the cylinder member of said first expansible chamber means to the open end of the cylinder member of said second expansible chamber means, a first fluid accumulator, second conduit means leading from the closed end of the cylinder member of said second expansible chamber means to said first accumulator, said first accumulator storing fluid energy when there is an increase in fluid pressure at the lower end of the cylinder member of said first expansible chamber means due to downward movement of the piston member of said first expansible chamber means, the cylinder member of said second expansible chamber means being attached to said head and the piston member thereof having a rod extending through an open end of this cylinder member and connected to said second blade means for moving said second blade means against the tree when this rod is retracted to cause said second blade means to top the tree and withdrawing the said second blade means when this rod is extended, the other end of the cylinder member of said second expansible chamber means being closed, said first conduit means also providing communication to the closed end of the cylinder member of said third expansible chamber means, a second fluid accumulator, third conduit means leading from the open end of the cylinder member of said third expansible chamber means to said second accumulator, said second accumulator being capable of storing fluid energy when there is an increase in fluid pressure at the lower end of the cylinder member of said first expansible chamber means, and a normally closed valve means in said third conduit means for preventing storage and release of fluid energy in said second accumulator except when said valve means is open.

11. Apparatus for delimbing trees in accordance with claim 10 including second blade means carried on said head movable against a tree for severing the top portion thereof, third expansible chamber means including a cylond expansible chamber means to cause actuation of said blade means.

13. Apparatus for delimbing trees in accordance with claim 12 including means for opening said valve means after said head has reached a tree portion of predetermined diminished size.

14. Apparatus for delimbing trees in accordance with claim 13 including means operable by said first blade means for triggering said valve means to its open position to effect a topping of the tree by the release of fluid energy stored in said second accumulator.

References Cited
UNITED STATES PATENTS

| | | | |
|---|---|---|---|
| 3,183,952 | 5/1965 | Larson | 144—34 |
| 3,269,436 | 8/1966 | Moore | 144—3 |

GERALD A. DOST, Primary Examiner

U.S. Cl. X.R.

144—3, 34

PO-1050
(5/69)

UNITED STATES PATENT OFFICE
CERTIFICATE OF CORRECTION

Patent No. 3,461,926      Dated August 19, 1969

Inventor(s) Robert W. Larson

It is certified that error appears in the above-identified patent and that said Letters Patent are hereby corrected as shown below:

Column 8, delete lines 4 through 15 and substitute therefor lines 74 and 75; delete lines 74 and 75 and substitute therefor lines 4 through 15.

SIGNED AND
SEALED

DEC 2 - 1969

(SEAL)
Attest:

Edward M. Fletcher, Jr.
Attesting Officer

WILLIAM E. SCHUYLER, J
Commissioner of Patent